Figure 1:
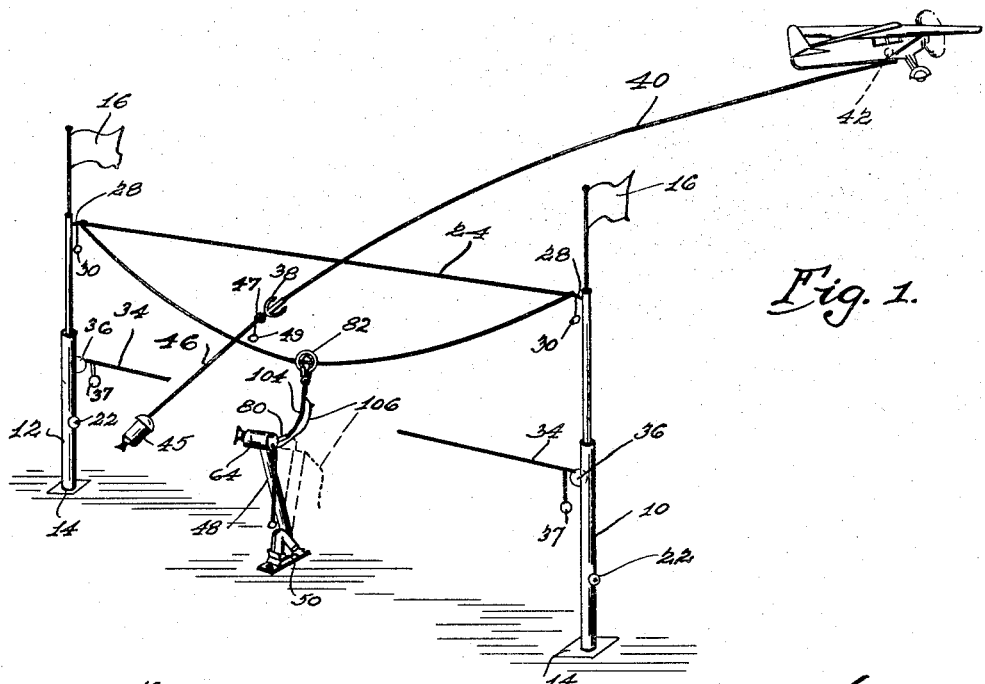

Nov. 23, 1943.  L. S. ADAMS  2,334,979
AIRPLANE PICK-UP AND DELIVERY SHOCK ABSORBING CONSTRUCTION
Filed Oct. 24, 1940  4 Sheets-Sheet 1

Inventor
Lytle S. Adams
By
Albert M. Austin
Attorney

Nov. 23, 1943.     L. S. ADAMS     2,334,979
AIRPLANE PICK-UP AND DELIVERY SHOCK ABSORBING CONSTRUCTION
Filed Oct. 24, 1940     4 Sheets-Sheet 2
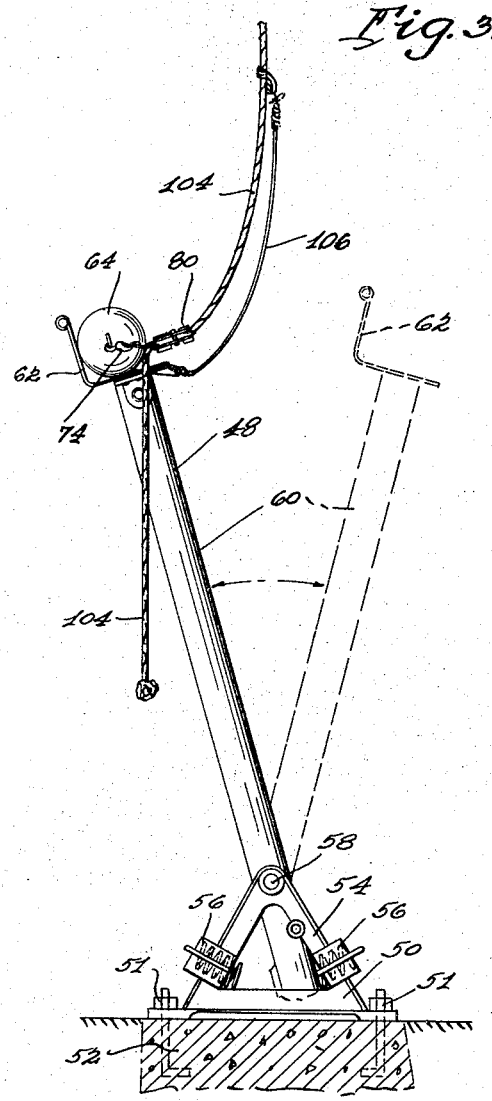
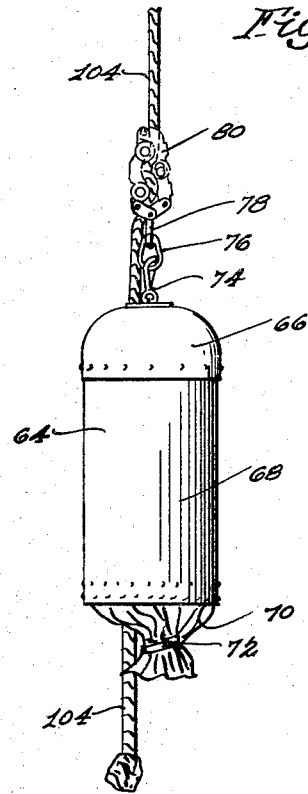
Inventor
Lytle S. Adams
By
Albert M. Austin
Attorney Nov. 23, 1943.   L. S. ADAMS   2,334,979
AIRPLANE PICK-UP AND DELIVERY SHOCK ABSORBING CONSTRUCTION
Filed Oct. 24, 1940   4 Sheets-Sheet 3
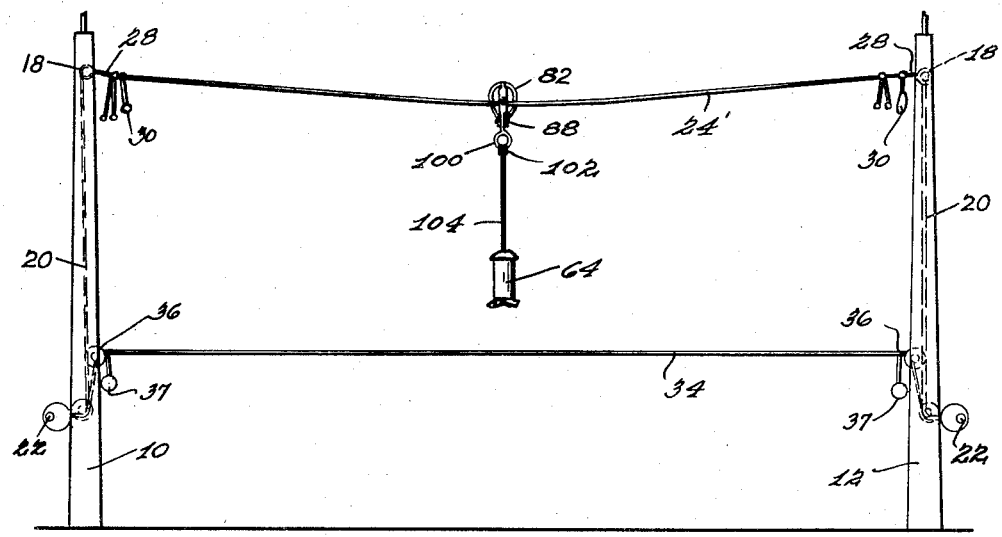
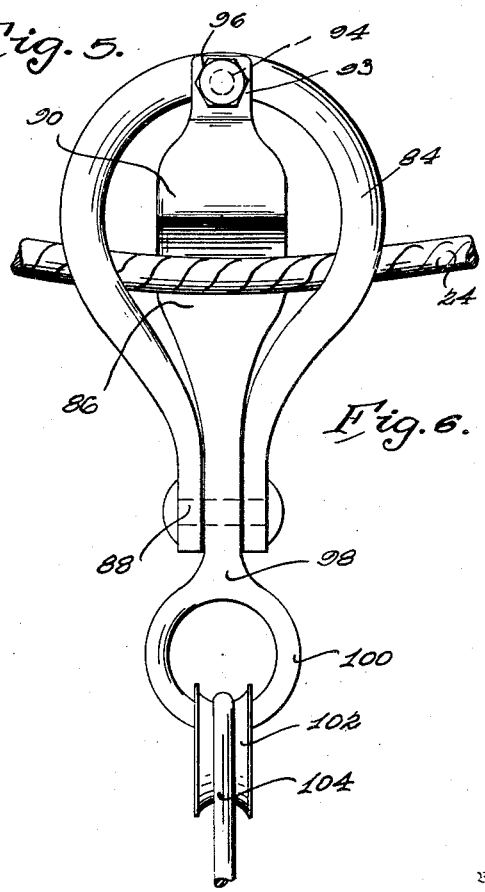
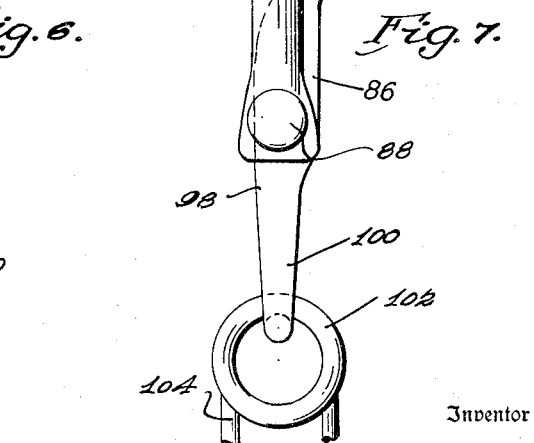
Inventor
Lytle S. Adams
By Albert M. Austin
Attorney Nov. 23, 1943.   L. S. ADAMS   2,334,979
AIRPLANE PICK-UP AND DELIVERY SHOCK ABSORBING CONSTRUCTION
Filed Oct. 24, 1940   4 Sheets-Sheet 4
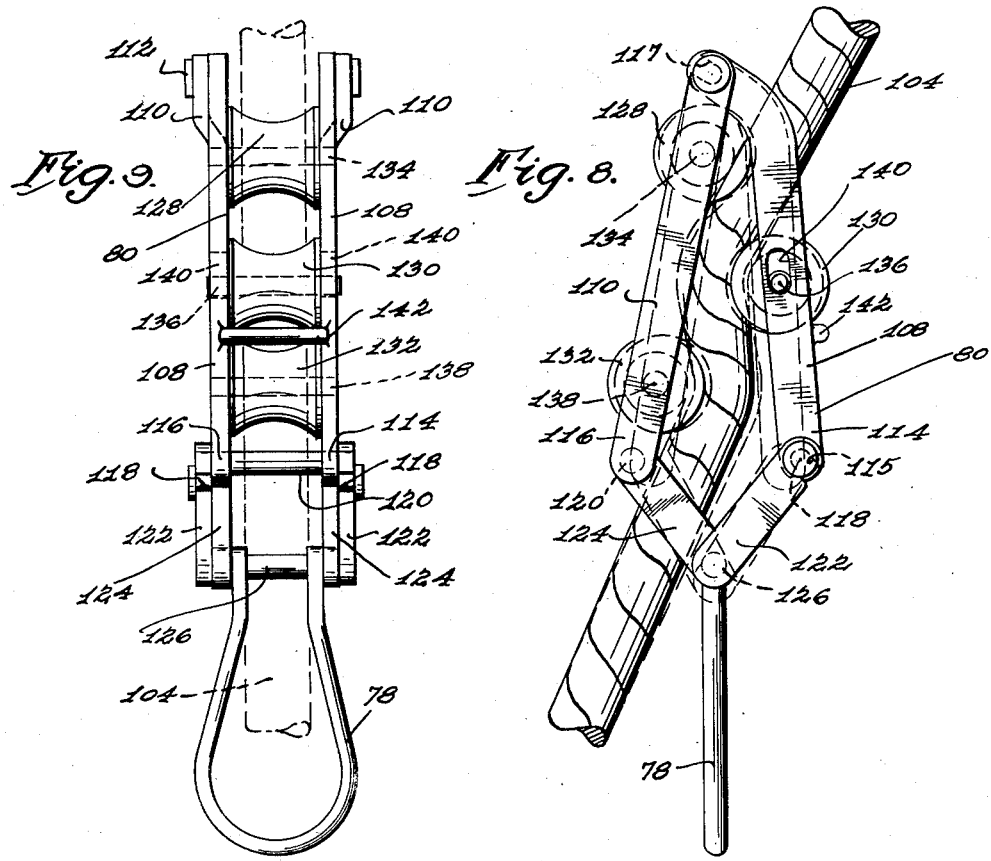
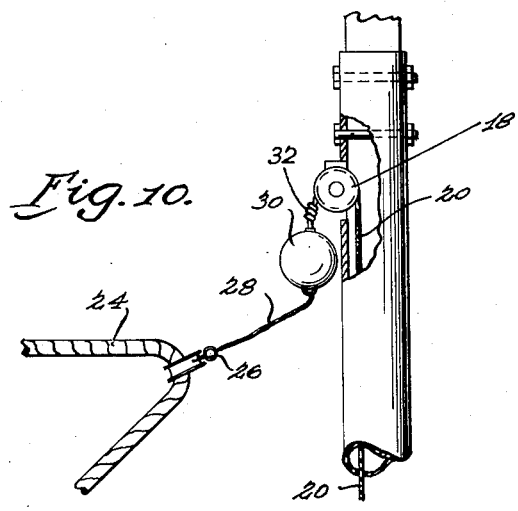
Inventor
Lytle S. Adams
By
Albert M. Austin
Attorney Patented Nov. 23, 1943

2,334,979

UNITED STATES PATENT OFFICE 2,334,979

AIRPLANE PICKUP AND DELIVERY SHOCK ABSORBING CONSTRUCTION

Lytle S. Adams, Irwin, Pa., assignor to All American Aviation, Inc., Wilmington, Del.

Application October 24, 1940, Serial No. 362,514

8 Claims. (Cl. 258—1.6)

This invention relates to a method and apparatus for simultaneously picking up and discharging articles from an aircraft while in flight, and is particularly directed to means for eliminating shock to the apparatus used on the ground as well as in the aircraft.

An object of my invention is to provide such an apparatus that permits pick-up and delivery of articles to and from an aircraft without arresting its flight.

Another object is to relieve the shock on the ground equipment, incident to the transfer of articles.

A further object is to reduce the shock to the aircraft at the time of engagement and release.

Still another object is to provide a construction which is simple to construct and to maintain.

A still further object of my invention is to provide means for relieving shock to the load, aircraft and apparatus by giving an impetus to the load to be picked up.

An additional object is to provide another shock absorbing means in the form of a slidable fitting.

Still another and further object is to design the shock absorbing devices to both the loop and T-types of transfer ropes.

A still additional object is to provide means for manually adjusting the first-mentioned shock-absorbing device and automatic means for adjusting the tension in the second shock-absorbing device.

Still further objects are to minimize snarling of the ropes and injury to the ground apparatus in the event of fouling.

With these and further objects in view, the invention may consist of certain novel features of construction and operation, as will be more fully described and particularly pointed out in the specification, drawings and claims appended hereto.

In the drawings which illustrate an embodiment of the device, and wherein like reference characters are used to designate like parts—

Figure 2:
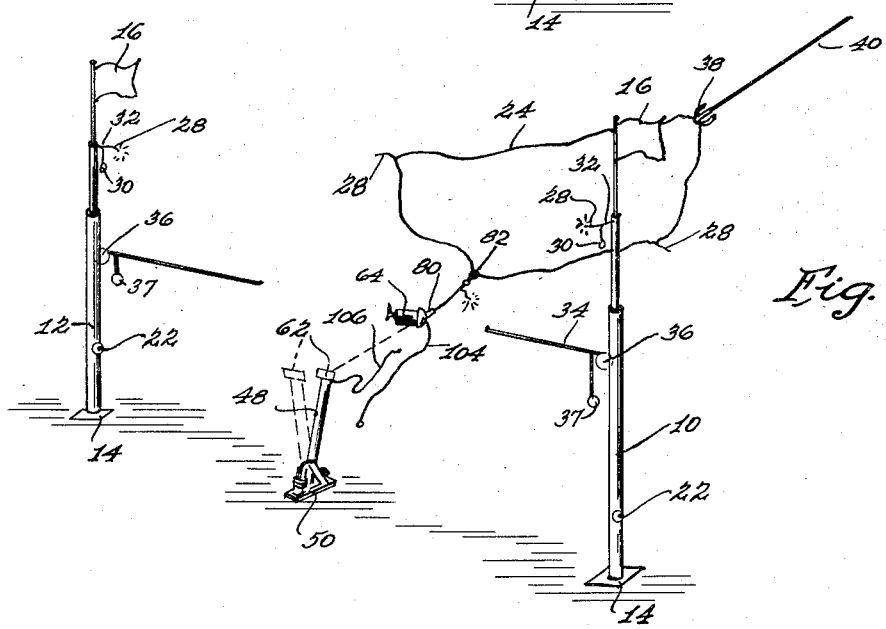

Figure 1 is a view showing the operation of my device just before engagement,

Fig. 2 is a similar view directly after engagement and release has been accomplished, Fig. 3 is an elevation of the catapult member, Fig. 4 is a view of the bag and the tension device, Fig. 5 is a modification of the transfer rope, called the T-type transfer construction, Fig. 6 is a detail of the slidable fitting, Fig. 7 is a side elevation of the same, Fig. 8 is a detail of the tension device, Fig. 9 is a side elevation of the same, while Fig. 10 is a fragmentary view of the connection at a post.

In the drawings, reference numbers 10 and 12 designate the hollow steel posts which are embedded in suitable concrete foundations 14. Marker flags 16 are secured to the top of the posts. Pulleys 18 (Fig. 10) are provided adjacent the top of the posts 10 and 12 over which are suspended hoist lines 20 which extend downwardly through the center of the posts. These hoist lines are secured to winches 22 to enable the loop transfer rope 24 to be drawn taut against the top of the posts.

The transfer rope 24 is secured to the hoist rope 20 by means of a slip ring construction 26 and break cord 28. A weight 30 is interposed in the line to enable the end 32 of the hoist line 20 to drop to the ground when there is no burden on the line.

In order to facilitate delivery of an article from an aircraft to the ground apparatus, a transfer rope 34 is stretched between the posts 10 and 12, where adjacent the posts, they pass over the pulleys 36 and extend down into the hollow posts by means of an opening therein. The ends of the transfer rope 34 are secured to winches 22 to permit proper positioning.

A grapple or hook 38 is secured to the grapple cable 40. In order to enable this cable to be lowered or drawn up into the aircraft, a drum 42 is provided. The grapple 38 may be of the conventional type, but has at its lower end a releasing link or frangible connection 47, to which is secured the load 45 to be released. This release is effected when the load 45 and load cable 46 strike against the lower transfer rope 34 and the strain as a result exceeds a predetermined amount.

A catapult device 48 (Fig. 3) is provided to give a starting impetus to the load to be picked up. This device comprises a base 50 and anchor bolts 51 imbedded in concrete 52. The trunnions 54 are provided with coil spring bumpers 56. Pivotally secured as at 58 is an upright 60 having cooperating engagement with the bumpers 56. A hopper 62 is integrally secured to the upright 60 and is adapted to receive the load or bag 64.

The bag 64 includes a fiber nose section 66 to which is secured a rubber skirt portion 68. This in turn envelopes and is secured to a canvas skirt portion 70. Usual bag closing means 72 are provided. A snap ring 74 and swivel-eye 76 are attached to the top of the nose section 66 and serve to connect, as at 78, the bag and the tension device 80 which will be described below.

This catapult construction supports the load and prevents sagging of the rope upon engagement. The forward impetus given the bag precludes the bag striking the ground or the snarling of the ropes adjacent thereto.

A slidable fitting 82 is provided to connect the load to the transfer loop 24. This construction includes a bifurcated ring 84 (see also Figs. 6 and 7) and a strap member 86 which is pivotally secured to the ring as at 88. The upper end of the strap member 86 is curved away from the ring as at 90 and then curved inwardly at its end 92. This end 92 is projected a substantial distance in front of the ring, terminating in an upwardly extending nose 93 lying in a plane approximately parallel to the ring 84. An opening 94 is provided in the strap 86 to receive an adjusting screw 96 to govern the space between the members 84 and 86.

Formed from the lower extension 98 is a ring 100. Secured to this ring is a sheave 102, over which a bag supporting rope 104 is inserted. A shock cord 106 is secured to the platform 62 and to the upper portion of the bag rope 104. The size and length of the shock cord 104 are so adjusted that it will not break until the bag has been catapulted 4 or 5 feet, thus retaining the bag in the hopper 62 until the breaking force has been applied to the shock cord.

The space created between the ring 84 and the strap member 86 is of sufficient width to permit the transfer rope 24 to pass therethrough. In installation the screw 96 is loosened and the cable 24 inserted until the tension device is approximately in the center between the posts 10 and 12. The screw is tightened until the proper tension is had on the rope 24.

It will be readily seen that the transfer rope 24 is normally parallel to the ground and the fitting 82 is easily slidable along the rope. When pick-up is made and the transfer rope assumes an approximately vertical position, the fitting 82 will exert a gripping action on the transfer rope and retard the speed so that the fitting 82 will slowly slide along the line to the end. Thus the fitting acts as a shock absorber to take up the jar as the pick-up is made.

The movable tension device 80 which is interposed between the bag and the tension device 82 is designed to absorb the shock to the bag upon contact of the grapple with the transfer line 24. The device includes a pair of spaced members 108 and 110 (see also Figs. 8 and 9) which are pivoted at 112. The lower ends of links 114 and 116 are pivotally mounted on shafts 118 and 120 respectively. Additional spaced link members 122 and 124 are likewise pivotally mounted on shafts 118 and 120. The lower portions of these links 122 and 124 are pivotally mounted on shaft 126, as are the ends of the ring connection 78. Rollers 128, 130 and 132 are mounted on shafts 134, 136 and 138 in between the spaced link members 108 and 110. Enlarged slots 140 are provided in the link members 108 to permit of adjustment of the roller 130 with respect to the rollers 128 and 132. A guard or spacing member 142 is provided across the two link members 108. Slots 115 and 117 are cut out of the link members on one side and at the top to permit the rope to be assembled.

The tension device shown in Figs. 8 and 9 fits around the bag rope 104 and by its clamping action creates a tension on the rope which is increased in proportion to the weight or force when in flight. The positions of the members and the effect on the rope when a force is exerted is indicated by dotted lines in Fig. 8.

Fig. 5 is somewhat similar to Fig. 1 except that a single or T-type of transfer rope 24' is used. The transfer rope 34 is the same as shown in Fig. 1 with pulleys 36 and weights 37 to raise and lower the rope to the proper height. For the sake of clearness, the transfer rope 34 is merely indicated in Figures 1 and 2, but it is readily apparent that the frangible connection or releasing link 47 breaks at the time of contact and, due to the weight 49 and the weight of the bag 45, the entire end of the line will wrap itself around the rope 34.

In summing up the operation, the aircraft unwinds the line 40 from drum 42 until the grapple 38 and bag 45 are suspended a suitable distance below the plane. Before the aircraft nears the ground apparatus, the transfer ropes 24 and 34 have been drawn up between the two posts. The catapult device with the load in the hopper has been positioned in the center of the posts and a suitable distance to the rear. The slidable fitting has also been positioned and connected to the bag in the manner heretofore explained.

The aircraft, flying sufficiently low to the ground, guides the grapple between the posts and upon engagement by the grapple 38 with the transfer rope 24, the catapult 48 throws the bag 64 forward, the shock cord 106 breaking as explained before. Simultaneously with the engagement of the transfer rope 24, the rope 46 strikes the transfer rope 34, breaking the connection 47, causing the bag, weight and rope to wrap themselves around the transfer rope 34. The aircraft in the meantime is clearing the field and the bag 64 is drawn up into the fuselage of the plane. Shock to the ground apparatus, load and aircraft is absorbed by the slidable, fitting and tension devices.

I claim:

1. A method of picking up a load by an aircraft or the like, which comprises applying from the ground a yieldable force to said load in the direction in which the load is to be moved, holding said load by the weight thereof in equilibrium against said yieldable force, applying a limited initial force to said load from the aircraft, said initial force being assisted by said yielding force to give an initial impetus to said load, and thereafter accelerating said load solely by applying gradually increasing force from said aircraft.

2. In a pick-up system for aircraft and the like having a grapple device, a transfer rope, a pair of spaced poles supporting said transfer rope, a catapult device comprising a holder for the load to be picked up, a ground mounted base for said holder, a spring device acting between said base and said holder and compressed by the positioning of said load on said holder in readiness for the picking-up operation, and a shock absorbing connection between said load and said transfer rope, said shock absorbing connection applying a limited initial force to said load when said transfer rope is engaged by said grapple device to cause said catapult to give an initial impetus to said load, said shock absorbing connection thereafter applying frictional accelerating force to said load.

3. In a pick-up system for aircraft and the like, a transfer rope, a pair of spaced poles supporting said transfer rope, a tension device slidably mounted on said transfer rope, a catapult device comprising a movable member, a base on which said member is pivoted, said member having a holder for the load, a spring device acting between said base and said movable member, said spring device being compressed by the positioning of said load on said holder in readiness for the picking-up operation, a shock absorbing connection between said load and said tension device, said shock absorbing connection comprising a rope, a gripping device which slidably grips said rope in proportion to the force applied thereto, and a frangible shock cord connecting said tension device and said holder.

4. In a pick-up system for aircraft and the like, a transfer rope, means supporting said transfer rope, a tension device slidably mounted on said transfer rope, a catapult device comprising a movable member, a base on which said member is mounted for movement, said member having a holder for the load, a spring acting between said base and said member and compressed by the positioning of said load on said holder in readiness for the picking-up operation, a shock absorbing connection between said load and said tension device, and a frangible connection between said tension device and said holder.

5. In a pick-up and delivery system, a transfer rope, means supporting said transfer rope, a slidable fitting on said rope, a load connected to said fitting, said fitting comprising a ring-shaped member having projecting legs, a strap member between said legs, a pivot connecting said strap member and legs, said strap member having an arched seat and a lug opposite said pivot, a set screw passing through said lug engaging said ring, said strap having a link portion connected to said load.

6. In an air pick-up system, a transfer rope adapted to be engaged by an aircraft pick-up device, means supporting said transfer rope, a slidable fitting on said rope, a load to be picked up connected to said fitting, said fitting comprising a ring member on one side of said rope, a strap member pivoted to said ring member and having a seat on the other side of said rope, and means for adjusting the distance between said ring member and strap member to adjust the frictional force on said rope.

7. In an air pick-up system, an aircraft having a pick-up device, a ground line adapted to be engaged by said pick-up device, a load to be picked up, a shock absorbing device connecting said ground line and said load, said shock absorbing device comprising a pair of link members pivoted at one end, one of said link members journaling two spaced rollers and the other of said link members journaling a single roller disposed between said first rollers, additional links pivoted to the other ends of said supporting links, a pivot connecting the ends of said additional links, said load being connected to said pivot, a rope engaged between said two rollers on the one hand and said single roller on the other hand, said rope being connected to said ground line, the tension applied between said ground line and said load causing said rollers to grip said rope with a force proportional to said tension.

8. In a pick-up system, a ground line adapted to be engaged by an aircraft pick-up device, a load to be picked up, a shock absorbing device connected between points on said ground line and on said load, said shock absorbing device comprising a pair of supporting links pivoted together, rollers journaled on said supporting links in staggered relationship, additional links pivoted to said supporting links, a pivot connecting said additional links and connected to one of said points, a rope engaged between said staggered rollers and connected to said other point, the force applied between said points causing said rollers to grip said rope.

LYTLE S. ADAMS.